Patented Oct. 16, 1934

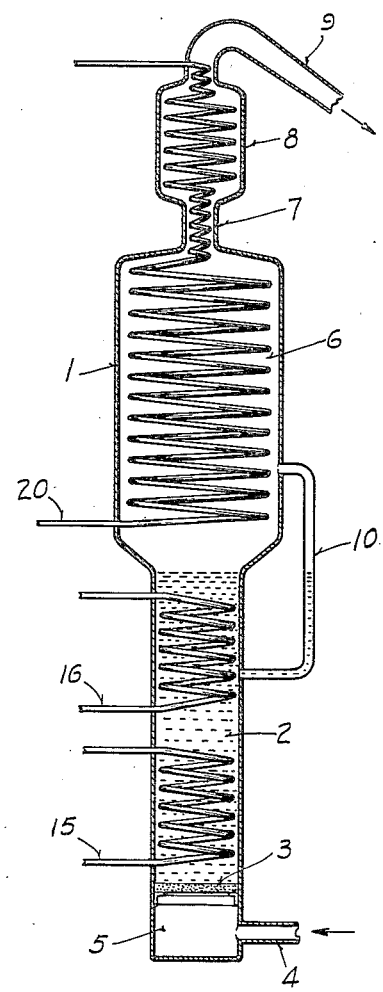

1,976,756

UNITED STATES PATENT OFFICE 1,976,756

MANUFACTURE OF ACETIC ACID

Walter O. Walker and Ulrich Kopsch, Milwaukee, Wis., assignors to A. O. Smith Corporation, Milwaukee, Wis., a corporation of New York Application May 7, 1932, Serial No. 609,816

14 Claims. (Cl. 260—116)

The invention relates to the manufacture of acetic acid by the oxidation of acetaldehyde, and especially to processes in which a catalyst solution containing cobaltic acetate and acetic acid is utilized.

It is among the objects of the invention to provide for manufacturing acetic acid from dilute or concentrated gaseous mixtures of the aldehyde by direct oxidation of the aldehyde with oxygen, air or other oxygen containing gases.

Another object of the invention is to provide for continuously operating the process.

In accordance with the invention, gaseous acetaldehyde is mixed with oxygen, air or other oxygen containing gases and the gaseous mixture is dispersed in or passed in intimate contact with an acetic acid solution containing cobaltic acetate. The oxidation is carried out in the solution at about 50° to 80° C. or at even lower or higher temperatures. In the continuous operation, the vapor space over the contact chamber and the upper portion of the catalyst solution is maintained at temperatures that will give vapor pressures of acetic acid which, by means of the passing gases, will remove acetic acid as a part of the exit gases as fast as it is formed.

With a given composition and quantity of gases, the temperature is regulated so that the level of the gas and liquor mixture remains constant provided no extraneous substances are introduced into the liquor from external sources. This in turn regulates the partial pressure of acetic acid in the vapor so that the acetic acid will be removed as fast as it is formed. With a conversion of about 90% of acetaldehyde to acetic acid, this partial pressure is approximately equivalent to the partial pressure of the acetaldehyde in the unoxidized gas.

The catalyst solution may be made by dissolving cobaltous acetate in acetic acid and activating it by heating the solution to about 50° to 70° C. and passing a mixture of acetaldehyde and oxygen through the solution until the color of the solution changes to dark greenish brown or black. This solution is composed of or contains cobaltic acetate in acetic acid and it is hereinafter referred to in the specification and claims as the catalyst solution. The catalyst solution commonly contains water, say about 6% more or less.

The following examples are mentioned as illustrative of the manner and method of practicing the invention.

I. A gas mixture composed of 26.7% acetaldehyde by volume and the remainder air was continuously bubbled through a porous alundum partition into a catalyst solution containing approximately 2% cobaltic acetate in acetic acid. The catalyst was heated to 65° C. and the vapor space above and the upper portion of the catalyst solution were maintained at about 83.5° C. It was found that about 91% of the acetaldehyde was converted into acetic acid, about 0.5% was not attacked, and the remainder was decomposed mainly to carbon dioxide and water. This mixture of gas was conducted into a condenser and the acetic acid removed. The velocity of the reaction was relatively rapid, about 6 to 18 seconds contact of gas and catalyst being amply sufficient. The concentration of the solvent in the catalyst remained approximately constant.

II. A gas mixture composed of 4.6% acetaldehyde, 2.9% oxygen and 92.5% hydrogen by volume was bubbled through an alundum partition into a catalyst solution of 2% cobaltic acetate in glacial acetic acid which was heated to about 65° C. This gas mixture contained an excess of about 30% oxygen over the theoretical requirement of oxygen for the oxidation of all the acetaldehyde to acetic acid. The vapor space over and the upper portion of the catalyst solution were heated to about 40° C. and the condensable vapors were condensed in a condenser. About 93% of the acetaldehyde yielded acetic acid, about 1% was unchanged and about 6% was decomposed into the non-condensable gases. The contact of gases and catalyst was about that which was described in Example I.

III. A gas mixture composed of 5.7% acetaldehyde by volume, 3.1% ethylene, 1.2% acetylene, 49% methane, and 37% hydrogen was mixed with sufficient air to supply a 100% excess of oxygen over the theoretical amount necessary to combine with the acetaldehyde and produce acetic acid. The mixed gas was bubbled through an alundum partition into a 2% catalyst solution of cobaltic acetate in glacial acetic acid which was heated to a reaction temperature of 65° C. to 70° C. The vapor space over and the upper portion of the catalyst solution were maintained at about 43° C. About 90% of the acetaldehyde was converted to acetic acid, a fractional percentage was unconverted and the remainder was changed into a non-condensable gas.

The velocity of the reaction is sufficiently rapid to employ short contact periods, say about 6 to 18 seconds, but longer contact periods are not harmful since the acetic acid and other products of the process are not vigorously acted on by the catalyst solution. Materially shorter contact periods give low efficiencies. It is desirable to provide as extensive contact as possible between the catalyst and the gas. A convenient method consists of dispersing the gas mixture as small bubbles through the catalyst solution, for example by passing the gas into the lower level of the solution through extremely small pores, such as a porous alundum plate. However, other methods of obtaining intimate contact of catalyst and reacting gases, such as spraying the catalyst into the gas may be used.

The oxidation of acetaldehyde can be accomplished with variations in the content of water and acetic acid in the catalyst solution and the process can be operated discontinuously by permitting some of the acetic acid to dissolve in the catalyst solution. Likewise, the catalyst may contain various concentrations of cobaltic acetate, water and acetic acid. Cobaltous acetate and other inert substances may be present. The concentration of cobaltic acetate may range from a few tenths of 1% to saturated solutions. A satisfactory catalyst may be made by dissolving 2 grams of cobaltous acetate containing four molecules of water of crystallization in 100 ccs. of glacial acetic acid which contains about 1.0% water. The cobaltous acetate is then partially or wholly converted to cobaltic acetate. Reference is made to this solution in the specification and claims as an approximately 2% catalyst solution.

The gas mixture may consist entirely of acetaldehyde and oxygen, but inert diluent gases, such as hydrogen, nitrogen, carbon monoxide, carbon dioxide, hydrocarbon gases and excessive amounts of oxygen may be present. Excellent results have been obtained with gas mixtures which contained as little as 2% acetaldehyde and the remainder inert gases. With lean mixtures it is desirable to employ larger excesses of oxygen.

In continuous operation, the acetic acid is removed from the catalyst by regulating the temperature of the vapor space above and the upper portion of the catalyst solution so that the acetic acid will be removed from the catalyst solution as fast as it is formed. Depending upon the concentration of acetic acid in the catalyst, the chosen reaction temperature and the concentration of acetic acid which is formed in the gas mixture, the vapor space and the upper portion of the catalyst solution may need to be heated or cooled. For example, when operating upon a mixture containing 26.7% acetaldehyde and the remainder air, a 2% cobaltic acetate catalyst solution and a reaction temperature of about 65° C., the vapors contained about 30.8% acetic acid in normal operation when all of the formed acetic acid was present in the exit gases. However, when the vapors over and the upper portion of the catalyst solution were not heated above reaction temperatures, the acetic acid accumulated in the catalyst solution. By heating the vapor space and the upper portion of the catalyst solution to about 83° C., the acetic acid was removed as fast as it was formed. An operation with the same conditions except that the gas mixture contained about 6% of acetaldehyde normally gave a gas containing about 6% acetic acid. In this case, the vapor had to be cooled to about 45° C. to give the necessary partial pressure of acetic acid in the exit gases. With a 2% acetaldehyde gas mixture, the same reaction temperature and catalyst, the vapor was cooled to about 23° C.

It is desirable to provide means in both the catalyst chamber and the vapor space for heating and cooling so that the desired temperatures will be maintained. It is to be understood that the partial pressure with a given catalyst solution must be changed whenever the concentration of acetaldehyde or formed acetic acid changes, and that a corresponding change of the temperature of the vapor and the upper layers of the solution is made.

In the drawing, the sole figure is a diagrammatic representation of an apparatus for continuous operation. The reaction column comprises a tubular column 1 having a catalyst chamber 2. A porous partition 3 at the bottom of the chamber may be composed of porous alundum. Mixed gas containing the desired proportions of acetaldehyde and oxygen is delivered under pressure through a supply pipe 4 to a header 5 at the bottom. The porous partition constitutes the top wall of the header and the mixed gas may be delivered at pressures which are only sufficient to overcome the resistance to flow through the partition and the static head of the catalyst.

The vapor space 6 may desirably consist of an enlargement of the column 1 in order to retard the flow of gas and give a longer period for the gas to be heated or cooled above the catalyst. The vapor space 6 leads through a connection 7 into a head 8 which constitutes a part of the vapor space. A connection 9 conducts the vapors from the head 8 to a condenser.

The catalyst solution is carried at the level just below the enlarged vapor space 6 and a glass tube 10 communicates with the vapor space 6 and the catalyst chamber 2 for indicating the level of the catalyst.

The temperature regulating means may consist of steam, water or electric heaters, and cooling pipes. To provide for all conditions of operation, we prefer to install a pipe coil 15 in the reaction zone at the bottom, and a pipe coil 16 in the intermediate zone at the top of the catalyst chamber. When the gas mixture is such that the temperature of the vapor space is materially higher or lower than the reaction temperature, we may heat or cool the catalyst solution, as the case may be. The coils are convenient for closely regulating the temperature of the catalyst solution. The height of the catalyst chamber depends upon the buoyancy of the gas bubbles and it must be at least as great as the distance through which the gas bubbles in the catalyst rise during the period of time allotted for the reaction. An extension constituting an intermediate zone in which the coils 16 are mounted is desirable.

The coils 20 are mounted in the vapor space and steam, hot water or cold water may be passed through the coils to regulate the temperature of the vapor. The coils are distributed through the entire vapor space. When the conditions of operation are so regulated that only heat has to be added to any part or to all of the system, electric heaters may be substituted for the pipe coils.

We claim:

1. The method of manufacturing acetic acid from acetaldehyde which comprises passing a gas containing acetaldehyde and oxygen in contact with a catalyst solution of cobalt acetate in acetic acid, maintaining reaction temperatures to oxidize acetaldehyde to acetic acid, and continuously separating the acetic acid vapor directly from the catalyst solution.

2. The method of manufacturing acetic acid from acetaldehyde which comprises continuously passing a gas containing oxygen and acetaldehyde into contact with a catalyst solution of cobaltic acetate in acetic acid, maintaining reaction temperatures to oxidize the acetaldehyde to acetic acid, and separating the acetic acid from the reaction mixture during its formation therein and at the rate it is formed.

3. The method of manufacturing acetic acid from acetaldehyde which comprises continuously passing a gas containing oxygen and acetaldehyde into contact with a catalyst solution of cobaltic acetate in glacial acetic acid, maintaining reaction temperatures to oxidize the acetaldehyde to acetic acid, and separating the acetic acid from the reaction mixture during its formation therein and at the rate it is formed.

4. The method of manufacturing acetic acid from acetaldehyde which comprises continuously passing a gas containing oxygen and acetaldehyde into contact with a catalyst solution of cobaltic acetate in acetic acid, maintaining reaction temperatures of about 50° to 80° C. to oxidize the acetaldehyde to acetic acid, and separating the acetic acid from the reaction mixture during its formation therein and at the rate it is formed.

5. The method of manufacturing acetic acid from acetaldehyde which comprises continuously passing a gas containing oxygen and acetaldehyde into contact with a catalyst solution of cobaltic acetate in acetic acid, maintaining reaction temperatures to oxidize the acetaldehyde to acetic acid, and regulating the temperature of the vapor over the catalyst so as to separate acetic acid vapor from the catalyst solution as fast as the acid is formed.

6. The method of manufacturing acetic acid from acetaldehyde which comprises continuously passing a gas containing oxygen and acetaldehyde into contact with a catalyst solution of cobaltic acetate in acetic acid, maintaining reaction temperatures to oxidze the acetaldehyde to acetic acid, and regulating the temperature of the discharged gases to provide a partial pressure of acetic acid in the vapor which will remove acetic acid as fast as it is formed.

7. The method of manufacturing acetic acid which comprises passing a gas mixture which contains at least 2% acetaldehyde, inert gas and at least sufficient oxygen to combine with all the acetaldehyde to form acetic acid in contact with a catalyst solution of cobalt acetate in glacial acetic acid, maintaining reaction temperatures in the solution of about 50° to 80° C., and regulating the temperature of the gases discharged from the vapor space over the solution to provide a partial pressure of acetic acid in the vapor which will remove the acetic acid as fast as it is formed.

8. The method of manufacturing acetic acid which comprises passing through a catalyst solution of cobalt acetate in acetic acid a gas mixture which contains at least 2% acetaldehyde, inert gas and at least sufficient oxygen to combine with the acetaldehyde to form acetic acid, maintaining reaction temperatures of about 50° to 80° C., and maintaining a constant quantity of solution and gas in the reaction chamber by regulating the temperature of the vapor to remove the acetic acid from the solution as fast as it is formed.

9. The method of manufacturing acetic acid which comprises contacting a mixed gas containing acetaldehyde and oxygen in excess of that which is necessary to oxidize the aldehyde to acetic acid with a catalyst solution of cobalt acetate in glacial acetic acid, maintaining reaction temperatures in the catalyst solution of about 65° C., and maintaining partial pressures of acetic acid over the solution which will remove the acid as fast as it is formed.

10. The method of manufacturing acetic acid which comprises contacting a mixed gas containing acetaldehyde and oxygen in excess of that which is necessary to oxidize the aldehyde to acetic acid with a catalyst solution of cobalt acetate in glacial acetic acid, maintaining reaction temperatures in the catalyst solution of about 65° C., and heating the vapors in the vapor space over the solution to temperatures to provide a partial pressure of acetic acid which will maintain a quantity of acetic acid in the discharged vapors equivalent to that which is formed.

11. The method of manufacturing acetic acid which comprises contacting a mixed gas containing acetaldehyde and oxygen in excess of that which is necessary to oxidize the aldehyde to acetic acid with a catalyst solution of cobalt acetate in glacial acetic acid, maintaining reaction temperatures in the catalyst solution of about 65° C., and cooling the vapors in the vapor space over the solution to temperatures to provide a partial pressure of acetic acid which will maintain a quantity of acetic acid in the discharged vapors equivalent to that which is formed.

12. The method of manufacturing acetic acid from acetaldehyde which comprises passing a gas containing oxygen in contact with acetaldehyde and an acetic acid solution of cobalt acetate in a reaction chamber, maintaining a reaction temperature to oxidize the acetaldehyde to acetic acid and continuously separating the acetic acid from the reaction mixture while in the reaction chamber.

13. The method of manufacturing acetic acid from acetaldehyde which comprises passing a gas containing oxygen in contact with acetaldehyde and an acetic acid solution of cobalt acetate in a reaction chamber, maintaining a reaction temperature to oxidize the acetaldehyde to acetic acid and continuously separating the acetic acid from the reaction mixture, while in the reaction chamber, at approximately the rate at which it is formed.

14. In the method of manufacturing acetic acid by the oxidation of acetaldehyde in contact with an acetic acid solution of a catalyst in a reaction chamber, the step which comprises continuously separating the acetic acid from the reaction mixture, while in the reaction chamber, at substantially the rate at which it is formed, by regulating the temperature of the vapor space in the reaction chamber so as to maintain the level of the catalyst solution substantially constant therein.

WALTER O. WALKER.
ULRICH KOPSCH.